United States Patent [19]

Hodes et al.

[11] Patent Number: 5,137,792
[45] Date of Patent: Aug. 11, 1992

[54] SLIDING OR FRICTIONAL LAMINATE HAVING FUNCTIONAL LAYER IN THE FORM OF A SOLID DISPERSION

[75] Inventors: Erich Hodes, Rossbach; Ulrich Engel, Bad Schwalbach, both of Fed. Rep. of Germany

[73] Assignee: Glyco Aktiengesellschaft, Wiesbaden, Fed. Rep. of Germany

[21] Appl. No.: 457,754
[22] PCT Filed: Apr. 14, 1989
[86] PCT No.: PCT/DE89/00229
  § 371 Date: Dec. 20, 1989
  § 102(e) Date: Dec. 20, 1989
[87] PCT Pub. No.: WO89/10434
  PCT Pub. Date: Nov. 2, 1989

[30] Foreign Application Priority Data

Apr. 23, 1988 [DE] Fed. Rep. of Germany ....... 3813802

[51] Int. Cl.$^5$ ............................ B32B 5/00; B32B 7/02; F16C 33/12; F16C 33/14
[52] U.S. Cl. ................................. 428/614; 428/645; 428/650; 384/912; 384/913; 148/903
[58] Field of Search ............ 428/614, 643, 644, 645, 428/646, 648, 650, 653, 674, 677, 937; 148/403, 902, 903; 384/912, 913; 252/12.2

[56] References Cited

U.S. PATENT DOCUMENTS

| | | | |
|---|---|---|---|
| 3,376,183 | 4/1968 | Flynn et al. | 252/12.2 |
| 3,658,488 | 4/1972 | Brown et al. | 428/644 |
| 4,157,923 | 6/1979 | Yen et al. | 427/34 |
| 4,232,094 | 11/1980 | Rhodes et al. | 428/937 |
| 4,267,241 | 5/1981 | Mahrus et al. | 428/645 |
| 4,471,032 | 9/1984 | Fukuoka et al. | 428/653 |
| 4,474,861 | 10/1984 | Ecer | 428/614 |
| 4,532,191 | 7/1985 | Humphries et al. | 427/34 |
| 4,675,204 | 6/1987 | Nicoll et al. | 427/34 |
| 4,900,639 | 2/1990 | Hodes et al. | 428/653 |
| 4,952,822 | 9/1990 | Steeg et al. | 384/912 |
| 4,973,523 | 11/1990 | Neuhaus et al. | 428/653 |

FOREIGN PATENT DOCUMENTS 2937108 3/1980 Fed. Rep. of Germany .
WO89/02365 3/1989 World Int. Prop. O. .

OTHER PUBLICATIONS

Abstract for JP 57-63679, Apr. 17, 1982.
Abstract for JP 60-116761, Jun. 24, 1985.
Abstract for JP 62-207883, Sep. 12, 1987.
Abstract for JP 55-148752, Nov. 19, 1980.
F. D. Seaman et al., "Using the Industrial Laser to Surface Harden and Alloy", Metal Progress, vol. 108, No. 3, Aug. 1975, pp. 67-72, 74.

Primary Examiner—John Zimmerman
Attorney, Agent, or Firm—Herbert Dubno; Ronald Lianides

[57] ABSTRACT

A laminate material or workpiece with a backing layer and a functional layer, in particular a friction bearing layer, with the structure of a solid but fusible dispersion with a matrix and at least one component which is dispersed in the matrix and which at least in the solid condition is insoluble in the material of the matrix or is soluble only in an amount which is smaller than the amount present, or with the structure of a substantially fusible mixture which is fixedly combined in itself and which can be used for tribological purposes, of components which are not soluble in each other or which are soluble only in an amount which is smaller than the amount present, possibly partially in crystal-like form, is transformed at the exposed surface of the functional layer into another structure in respect of the dispersion alloy or the mixture by melting and extremely rapid cooling from the molten condition, so that fine globular distribution of the undissolved components occurs and the material of the surface region is frozen in a quasi amorphous condition. That surface region may be from 20 to 500 µm in thickness. The structural transformation is effected by means of a laser beam.

20 Claims, 2 Drawing Sheets

SLIDING OR FRICTIONAL LAMINATE HAVING FUNCTIONAL LAYER IN THE FORM OF A SOLID DISPERSION

BACKGROUND OF THE INVENTION

1. Field of the Invention

The invention relates to a laminate material or laminate workpiece comprising a functional layer which is disposed on a backing layer, in particular a friction bearing layer with the structure of a solid but fusible dispersion with a matrix and at least one component which is dispersed in the matrix and which at least in the solid condition is insoluble in the material of the matrix or is soluble only in an amount smaller than the amount present, or with the structure of a substantially fusible mixture, which can be used for tribological purposes and which fixedly combined in itself, of components which are not soluble in each other or which are soluble in each other only in an amount smaller than the amount present, possibly/partly in crystal-like form.

2. The Related Art

Composite friction bearings may be considered as laminate materials or laminate workpieces. The functional layer of such friction bearings comprises a dispersion alloy, in particular lead bronze or an aluminium/tin dispersion alloy or an aluminium/lead dispersion alloy, and is applied to a backing layer, primarily of steel, which forms the bearing shell. In that connection, composite bearings of steel/lead bronze laminate material are of particular significance because of the high dynamic load-carrying capacity and the good run-in and emergency-running properties of the lead bronze. Due to the total insolubility of the two metals in each other in the solid condition, there is practically a mechanical mixture of copper and lead present in a functional layer consisting of lead bronze, and that mixture is produced from the homogeneous molten material in the course of a long setting time. The steel/lead bronze laminate materials which are conventionally used nowadays and which are produced by a strip coating process on steel are restricted to lead contents of up to about 22% by weight of the lead bronze. The difficulties in regard to manufacture of copper/lead alloys with lead contents within the miscibility gap, that is to say lead contents of between 40 and 50% by weight, are so great that hitherto such alloys have not been able to acquire any practical significance. Bonding between the steel backing member and cast lead bronze occurs through a strong metal bond between the steel backing member and the copper crystallites, the latter being formed primarily by solidification of the molten material. Therefore, formation of such copper crystallites must be encouraged. In practice, crystallites are achieved by holding the steel at a temperature of about 1100° C. during casting of the lead bronze thereon. This procedure permits diffusion bonding between the steel and the copper crystallites. On the other hand, the structure of the lead bronze functional layer, which is heterogeneous due to the copper crystallites and lead precipitates gives rise to serious functional disadvantages in comparison with a homogeneous function layer structure. Comparable circumstances also arise in regard to friction bearing layers, representing the functional layer, consisting of aluminium/tin dispersion alloys and aluminium/lead dispersion alloys, as well as all conceivable functional layers for tribological purposes with a heterogeneous structure. For example, including the case of structures of mixtures which are fixedly combined in themselves and which are substantially fusible, of components which are not soluble in each other or which are soluble only in an amount which is smaller than the amount present.

German laid-open application (DE-OS) No. 29 37 108 already discloses a process for refining sliding alloys, in particular sliding or friction bearing alloys. Therein the alloy is subjected to a locally proceeding, punctiform melting effect by means of one or more highly concentrated energy or heat beams. The procedure is intended to cause sudden cooling of the molten material. The effect is achieved by progressive movement of the punctiform surface portion which is subjected to the energy or heat beam and by the dissipation of heat which occurs in the material of he functional layer. In that known process, the functional layer which has a heterogeneous material structure is melted in the punctiform areas over its entire thickness. However, the amount of heat which is supplied in that operation is so great that the intended sudden cooling effect is still so slow—not least having regard to the latent heat of fusion which is released again when the material re-solidifies—that that procedure results in formation of a heterogeneous structure which at best is somewhat refined in comparison with the original structure. It is not possible thereby to achieve a substantial improvement in the functional properties of friction bearing layers of dispersion alloys and other mixtures which can be used for tribological purposes. In the case of functional layers of lead bronze, there is also the consideration that the desired diffusion bonding effect is eliminated or at least made substantially worse because the functional layer is locally melted over its entire thickness.

It is also known from EP 130 175 A2 and 130 176 A2, in relation to friction bearings, to form areas of different levels of hardness in the running surface. These patents disclose a procedure which provides that delimited zones of the running surfaces are subjected to a heat treatment by a laser beam or an electron beam and are thus caused to start to melt or to undergo transformation due to melting. In that connection, however, the primary consideration is to provide for different levels of hardness by melting other alloys or other alloying constituents into the material.

Finally, it is known from German laid-open application (DE-OS) No. 36 36 641 and EP 212 938 A2 for sliding or friction bearing layers to be formed on a strip-like carrier, for example a steel backing member, by a procedure which provides that the alloying components are firstly applied in powder form to the backing member. The powder is then progressively locally melted, using a laser beam which is guided over the layer of powder in a predetermined pattern. Admittedly it is possible for the layers produced in that way from dispersion alloy to have a finer structure than that found in cast functional layers of dispersion alloy. However, it is also not possible in that way to produce functional properties which are comparable to those of a quasi homogeneous functional layer. In addition the fact that previously sprinkled powder is caused to melt progressively in a punctiform region means that the desired diffusion bonding between the backing layer and the functional layer cannot be attained.

In comparison therewith, the problem of the present invention is substantially to improve laminate material or laminate workpieces in such a way that on the one hand a securer bond—if possible from the point of view of the material involved, a diffusion bonding—is guaranteed between the backing layer and the functional layer, while at its surface which performs the function in question the functional layer is to have a structure which enjoys functional properties which are substantially improved in comparison with functional layers with a heterogeneous structure.

SUMMARY OF THE INVENTION

In accordance with the invention previous problems are solved in that the functional layer, at the side thereof remote from the backing layer, has a thin surface region which is closed throughout in a layer-like form and in which the dispersion or the mixture is frozen in a quasi amorphous condition, by melting and extremely rapid cooling from the molten condition, with fine globular distribution of the components.

The invention is based on the realisation that a functional layer and in particular a sliding or friction bearing layer is determined in regard to its various functional properties by different regions of the layer. Thus the bonding capability for bonding of the functional layer to a backing layer is determined by the structure of the functional layer in the vicinity of the backing layer. The capacity for the layers to be satisfactorily held together, layer toughness and pressure-carrying capability of the layer are determined by the structure in the middle region of the layer while the frictional characteristics, fatigue strength and similar properties are determined by the structure in a relatively thin surface region of the functional layer. By virtue of the initially heterogeneous structure being transformed in accordance with the invention into a quasi amorphous structure only in a thin surface region of the functional layer, the properties of a heterogeneous layer, which are advantageous in regard to the bonding effect, are put to optimum use. Likewise the pressure-carrying capacity, toughness and internal cohesion of the functional layer are also advantageously affected by the heterogeneous structure, possibly with the inclusion of crystallised particles. Therefore in accordance with the invention, there is provided a combination of a heterogeneous, possibly partially crystallised condition of the functional layer in its lower part and a quasi amorphous condition in a thin surface region. By virtue of that combination of two regions of substantially different structures, which are closed throughout in a layer configuration, the functional layer can be adapted to practically any desired range of properties. The relationship in respect of thickness of the portion of the layer with a heterogeneous structure to the portion of the layer with an amorphous structure, as well as the degree of the amorphous condition and possibly an additional variation in the portion of the layer in the amorphous condition due to inclusions therein can be used as parameters in regard to the adaptation effect.

The surface region of the functional layer, which has a fine globular distribution of the components in a quasi amorphous condition, may be of a thickness of between 20 $\mu$m and 500 $\mu$m, 50 $\mu$m and 100 $\mu$m. Generally it is preferable for the surface region of the functional layer, which has the fine globular distribution of the components in a quasi amorphous condition, to be of substantially uniform thickness. It will be appreciated that for specific purposes the surface region of the functional layer, which has the fine globular distribution of the components in a quasi amorphous condition, may also be of a thickness which varies over the surface. For example, in the case of sliding or friction bearings, the layer forming the functional layer may be provided in the main loading region with a surface region with fine globular distribution of the components of greater thickness than in the regions which are subjected to a lower loading.

In accordance with the invention the functional layer may be formed from a dispersion or a mixture with a matrix or supporting component of the mixture, on the basis of one or more of the following metals: copper, aluminium, zinc and silver; and at least one component which is dispersed or included in some other manner, on the basis of one or more of the following substances in the form of fine particles: lead, tin, bismuth, indium, nickel, manganese, silicon, carbon (preferably in the form of graphite particles encased with metal such as nickel, aluminum or copper), molybdenum disulphide (preferably encased with metal such as nickel, aluminium or copper), boron nitride, and plastics materials which can be used for tribological purposes such as for example polyester, PTFE, PEK and PEEK.

In accordance with the invention, one or more additives of the following group of substances in a total amount of up to 2% by weight, preferably 0.5% by weight, may be alloyed to the metal components of the mixture or dispersion forming the functional layer: Li, Na, Ca, Ba, Bi, Si, P, As, Sb, S, Se, TE, Zn, Ti, Zr, Ce, Cr, Mn, Fe, Co, Ni, Si+Zr, Si+Zr+S. As is known, those additives produce a structure refining effect. It was found however that the influence of the cooling conditions predominates over the influence of such additives. All the same, the specified additives have the advantage that, upon a transformation of structure in the surface region of the functional layer by melting and extremely rapid cooling from the molten condition, the attainment of a fine globular distribution of the undissolved components and the attainment of a frozen quasi amorphous condition can be facilitated and ensured.

For use for tribological purposes, in particular in the case of sliding or friction bearings, the functional layer which in that case is the sliding or friction bearing layer can preferably be formed from lead bronze, preferably of the composition CuPb22Sn, or lead tin bronze.

In such functional or bearing layers of lead bronze, the invention can be used to particular advantage because therein the dentritic structure of the lead bronze is eliminated by melting and immediately following rapid cooling in a thin surface region which is closed throughout in the form of a layer, and the lead bronze is frozen in a fine globular distribution in respect of the lead tin particles in a quasi amorphous condition. The lead bronze which is frozen in a quasi amorphous condition affords excellent sliding or friction properties, in particular in relation to tribological partners of steel.

Similar advantages are enjoyed when the invention is used in relation to tribological elements in which the functional layer, more specifically also in this case the sliding or friction layer thereof, is formed from an aluminium/tin dispersion alloy, for example AlSn-6CuNi, AlSn20Cu or AlSn40Cu. In view of the immiscibility of aluminium and tin, such dispersion alloys with an aluminium matrix cannot be cast as a functional layer or a sliding or friction layer, other than by a procedure providing that, when solidification occurs, there is phase separation as between the aluminium and the tin and particles of separated-out tin alloy are included in the aluminium matrix. In the surface region, which is formed in accordance with the invention, of such a functional layer or bearing layer, those tin alloy particles are then in a globular distribution in the matrix of pure aluminium alloy. In accordance with the invention, a surface region in quasi amorphous condition is also frozen in such functional layers or bearing layers of aluminium tin dispersion alloy. In that case also the surface region affords substantially improved sliding properties.

Similar conditions may be achieved in functional layers of aluminium/lead dispersion alloy, for example AlPb8Si4SnCu by virtue of the surface region which is frozen in accordance with the invention in a quasi amorphous condition. Such functional layers are preferably also used as a sliding or friction bearing layer in tribological elements.

In a particularly advantageous development of the invention, hard particles of a size of between about 10 μm and 200 μm can be subsequently included in the surface region of the functional layer, which is in a quasi amorphous condition, more specifically hard particles from the group consisting of TiC, WC, glass powder, $Si_3N_4$, SiC and $Al_2O_3$ and/or hard particles on the basis of Laves phases ($AB_2$), preferably of the type $MgCu_2$ or the type $MgZn_2$, $MgNi_2$, wherein the relationship in respect of radius of the A-atoms and B-atoms is:

$$r_A/r_B = 1.225.$$

Those hard particles which are subsequently included in the surface region of the functional layer permit the functional characteristics of the functional layer to be substantially improved in that surface region, and in particular permit them to be adapted to any desired function in an improved fashion, for example the resistance to abrasion in the case of sliding or friction bearing layers forming the functional layer can be improved and adapted to the respective nature of the tribological partner, for example steel crankshafts produced by a die casting operation and the like.

In another advantageous development of the invention, at its surface region which has globular distribution of the components in a quasi amorphous condition, the functional layer is initially covered with a soft metal overlay of a thickness of between 10 μm and 50 μm. When the functional layer is in the form of a sliding or friction bearing layer, the overlay may be in the form of a run-in layer. It is possible in that connection for example for the overlay to be in the form of a galvanically applied layer comprising one of the following alloys: PbSn, PbSnCu, SnSb, PbSnSb and PbIn. In a tribological use, as a run-in layer, such an overlay affords a particularly advantageous functional co-operation with the surface region of the sliding or friction bearing layer, which is in a quasi amorphous condition. As a soft overlay of that kind also fills up very slight irregularities and porosities at the surface of the surface region in the quasi amorphous condition and the soft material of the overlay acts in the manner of a solid lubricant in relation to the surface region, in the quasi amorphous condition, of the functional layer or bearing layer. Depending on the composition of the material of the functional layer or bearing layer and the overlay, a diffusion barrier layer of a thickness of between about 2 μm and 10 μm may be provided between the overlay and the functional layer, wherein the diffusion barrier layer can in turn be adapted in respect of its material composition to the material composition of the overlay and the functional layer or bearing layer, and can be formed from one of the materials CuSn, CuZn, NiSn, NiCr, NiCo, Co, Ti and Ni.

For the production of laminate material or laminate workpieces according to the invention, it is possible to use a process in which the functional layer is formed from fusible dispersion or from a fusible mixture which can be used for tribological purposes, by casting, spraying or by powder metallurgy, on the backing layer, and possibly compacted. In accordance with the invention, taking such a process as the basic starting point, the solid, cooled functional layer which is still exposed with its surface at the side remote from the backing layer is heated at said exposed surface in a surface area which is progressively moved over the entire surface and which is closely delimited in a punctiform configuration, by means of at least one laser beam or laser beam ray, until melting of the dispersion or the mixture occurs in a surface region, and is then immediately cooled down again at a cooling rate of at least $10^3$ K/s, with solidification occurring. In that process, the surface of the functional layer which is formed by casting, spraying or by powder metallurgy and which has a heterogeneous structure of one kind or the other is scanned or raked with a high output laser. In that operation, in each surface area which is closely defined in a punctiform configuration, the high output laser, with a very high heating rate (up to $10^5$ K/s) produces an extremely steep temperature gradient between the very small heated and fused volume of material of the closely delimited punctiform surface area, and the remainder of the laminate material. As the laser beam is moved along, the amount of heat absorbed in the closely delimited punctiform surface area is conducted into the interior of the laminate material and, when that happens, the critical cooling rate required to produce a fine-grain structure in the edge region adjacent the surface is exceeded.

It has now been found that, in dependence on the width of the laminate material and the depth of the surface region to be influenced, laser beam power density levels of between $10^3$ and $10^7$ W/cm³ and local action periods of between $10^{-2}$ sec to 10 sec are to be preferred. In order to improve adsorption of the laser beam at the surface of the functional layer and thereby to enhance the efficiency of the process according to the invention, prior to the laser beam treatment the exposed surface of the functional layer may be provided with a reflection-reducing coating. For that purpose for example the exposed surface of the functional layer may be coated prior to the laser beam treatment with a suspension of graphite or molybdenum disulphide. It is also possible for the exposed surface of the functional layer to be oxidised or provided with a dark grey phosphate layer, prior to the laser beam treatment.

In order still substantially to increase the cooling rate and thus still better to ensure that the small amount of material which is melted by the laser beam is frozen in a quasi amorphous condition, the process according to the invention may provide that the laminate material or workpiece is cooled during the laser beam treatment from the backing layer side and a cooling rate of $10^3$ K/s to $10^5$ K/s is produced at the heated surface area which is closely delimited in a punctiform configuration. In addition or instead, the surface which is treated with the laser beam may also have cold gas, possibly with an admixture of sublimating cooling agent in powder form, blown or caused to sweep thereover, to provide the cooling effect. For the purposes of inclusion of hard particles in the surface region which is treated with the laser beam, the process according to the invention may be combined with the step of particle injection. For that purpose, in accordance with the process of the invention, fine hard particles of a size of between about 10 μm and about 100 μm, preferably between 20 μm and about 50 μm are injected, preferably by being blown in, into the punctiform molten bath formed with the laser beam in the surface region to be treated. By virtue of that particle injection operation, the hard particles which are introduced into the punctiform molten bath, in a non-molten condition, are uniformly distributed in that small amount of molten material. That mode of operation provides for an edge zone adjacent the surface, or a surface region, with excellent wearing properties, which is of particular advantage especially in relation to tribological use of the treated material or the treated workpieces. More specifically, it results in a substantial increase in the resistance to wear of bearing materials or bearing workpieces. Hard particles from the group consisting of TiC, WC, SiC, $Al_2O_3$ may be considered for the particle injection operation. A particularly advantageous particle injection operation involves using hard particles based on Laves phases ($AB_2$), preferably with a relationship in respect of radius between the A-atoms and the B-atoms: $r_A/r_B = 1.225$, for example Laves phases of type $MgCu_2$ or type $MgZn_2$, $MgNi_2$. The injection of hard particles based on Laves phases has proven to be extremely effective in particular for the treatment of bearing materials and bearing workpieces.

Particularly suitable for the production of laminate material or laminate workpieces according to the invention is an apparatus in which a laser beam tube is mounted on a co-ordinate guide means and the laminate material or laminate workpiece is held on the co-ordinate guide means with its surface to be treated towards the laser beam tube. In that arrangement the co-ordinate guide means is to be so adapted in respect of the relative movement produced thereby between the laser beam tube and the laminate material or workpiece, that the laser beam is moved with a predetermined speed and in a predetermined pattern and giving total cover over the surface of the laminate material or workpiece to be treated. Having regard to the wavelength spectrum of its laser beams, the use of an Excimer laser beam tube (Krypton fluoride, xenium chloride) presents itself in accordance with the invention. However, having regard to the output which can be achieved, the use of a $Co_2$ laser beam tube is to be preferred hitherto. With such a $Co_2$ laser beam tube with an output of 5 kW to 10 kW, it is readily possible to achieve an adequate depth of penetration and depth of melting of the surface region, at about 50 μm to 100 μm, with a feed rate which can be used in practice.

It is also possible however to use other gas lasers, for example He-Ne-lasers or solid-state lasers and semiconductor lasers in accordance with the invention.

BRIEF DESCRIPTION OF THE DRAWING

Embodiments of the invention are described in greater detail hereinafter with reference to the drawing in which.

DETAILED DESCRIPTION

Figure 1:
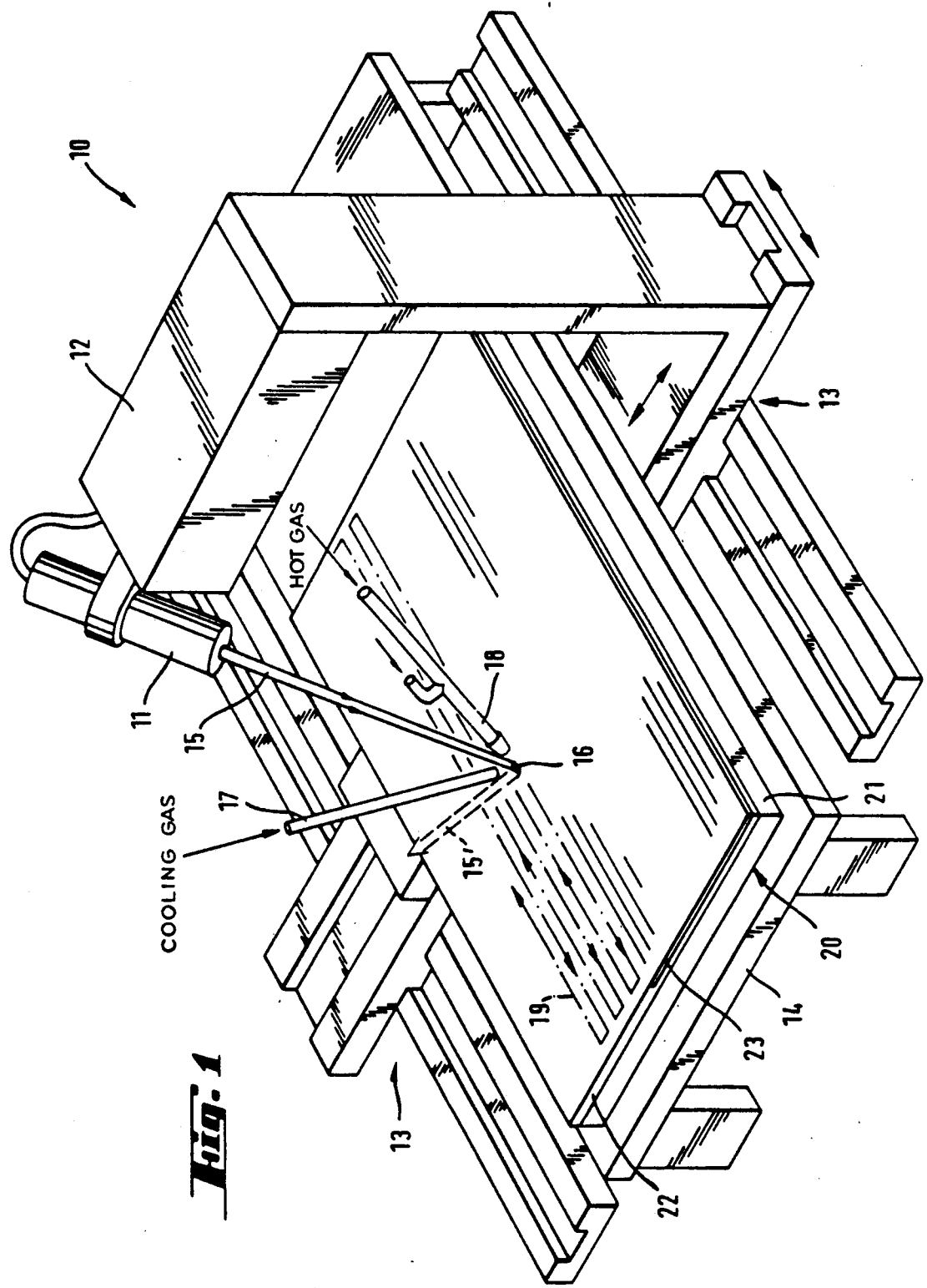
FIG. 1 is a diagrammatic perspective view of the process and apparatus according to the invention.

The apparatus 10 diagrammatically shown in FIG. 1 includes a laser beam tube 11, for example a $Co_2$ laser beam tube which is mounted with its operating device 12 on a co-ordinate guide means 13. The laminate material 20 to be treated comprises a backing layer 21 and a functional layer 22. The laminate material 20 is fitted on to a stationary support device 14, beneath which the movable co-ordinate guide means 13 extends in the illustrated embodiment. The support means 14 includes a cooling means so that the laminate material 20 is cooled from the surface of the backing layer 21, which is supported on the support means 14. As indicated in FIG. 1, the laser beam 15 from the laser beam tube 11 is focussed in such a way that a focal spot 16 is formed on the exposed surface of the functional layer 22. For the purposes of cooling the punctiform molten bath which is of closely delimited configuration and which is formed in the focal spot 16, gas, for example argon or nitrogen, may be blown on to the spot 16 by way of a tubular nozzle 17. Sublimating cooling agent, for example dry ice, in the form of fine powder, may be mixed with the cooling gas, if desired. In the event that particle injection is to be effected, the arrangement has a particle injection nozzle 18 which can be operated with hot gas and which receives the particles to be injected at the diagrammatically illustrated lateral inlet.

By virtue of the movements of the co-ordinate guide means 13, as indicated by the double-headed arrows, the laser beam tube 11 may be moved in such a manner with respect to the laminate material 20 or laminate workpiece that the spot 16 is moved along a meandering path 19 over the free surface of the laminate material 20 or laminate workpiece. In that operation, a small amount of the material of the functional layer is always caused to melt in succession in the surface region 23 of the functional layer and is then immediately cooled down again extremely rapidly, in which case particle injection can selectively be effected.

FIG. 1 only shows a diagrammatic view. Instead of the flat portion illustrated of a laminate material 20, it would also be possible to treat a workpiece which is curved or which is non-flat in some other fashion. The support means 14 would have to be suitably designed for that purpose and instead of the co-ordinate guide means 13 which is movable in one plane, the arrangement would have to include a co-ordinate guide means which controls the desired movement of the focal spot 16 in a curved configuration or in a configuration which is non-flat in some other fashion.

The laser beam tube 11 may be designed for a laser beam power density of between $10^3$ and $10^7$ W/cm$^2$, while the co-ordinate guide means 13 may be designed or may be controllable in such a way that, in the feed movement of the focal spot, it permits the laser beam 15 to act at the focal spot 16 for an action period of between $10^{-2}$ s to 10 s.

As inevitably a part of the laser beam 15 is reflected, as indicated by the broken line 15' in FIG. 1, it is desirable for the free surface of the functional layer 22 to be provided with a coating for reducing laser beam reflection. For that purpose the exposed surface of the functional layer 22 may be coated with a suspension of graphite or molybdenum disulphide prior to the treatment with the laser beam. It is also possible for the exposed surface of the functional layer to be provided with a dark grey phosphate layer or for that surface to be oxidised, prior to the laser beam treatment.

By virtue of the effective cooling of the laminate material 20 or laminate workpiece from the support means 14 and the additional cooling effect at the focal spot 16 by means of the cooling gas nozzle 17, the small amount of functional layer material which is in a molten condition in the focal spot 16 is very rapidly cooled down. Rapid cooling is made possible in particular by virtue of the fact that the heat produced in the focal spot is rapidly carried away in all directions due to the high level of thermal conductivity of the material of the functional layer 22 and the material of the backing layer 21, especially as a very high temperature gradient is produced by the close punctiform delimitation of the focal spot 16, at the boundary surface thereof, towards the remainder of the laminate material or workpiece.

The depth to which the material is melted in the focal spot 16 is determined by the power density of the laser beam 15 and the speed of feed movement of the focal spot 16 on the surface of the laminate material 20 or the laminate workpiece. Depending on the situation of use, the depth of melting can be set at between 20 $\mu$m and 500 $\mu$m, preferably between 50 $\mu$m and 100 $\mu$m. The set depth of melting then corresponds to the thickness of the surface region 23 with transformed structure. Due to the rapid cooling and solidification of the molten material when the focal spot 16 moves on, a virtually homogeneous structure is developed in the surface region 23 of the functional layer material, with fine globular distribution of the undissolved components in a quasi amorphous condition.

The apparatus shown in FIG. 1 and the process which can be carried out therewith may be used in relation to functional layers 22 of widely different structures. Preferably it can be used for surface treatment of functional layers of lead bronze. It is also possible however to consider the surface treatment of functional layers of aluminum/tin dispersion alloys and the surface treatment of functional layers of aluminium/lead dispersion alloys. In general, surface treatments of the specified kind may be considered for functional layers 22 of fusible material of any kind.

Hard particles of a size of between about 10 $\mu$m and 200 $\mu$m, preferably hard particles of a size of between about 20 and 50 $\mu$m, may be considered for the above-mentioned operation of injecting hard particles. The hard particles may be from the group consisting of TiC, WC, glass dust, $Si_3N_4$, SiC or $Al_2O_3$ or hard particles on the basis of Laves phases.

Figure 2:
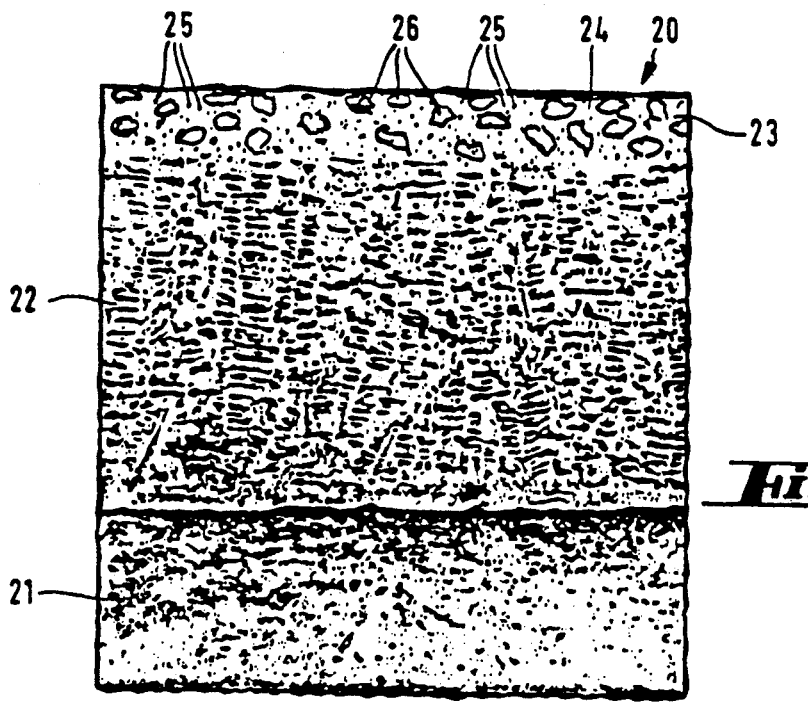
FIG. 2 shows a portion, in the nature of a polished section, of an embodiment of the laminate material according to the invention.
Figure 3:
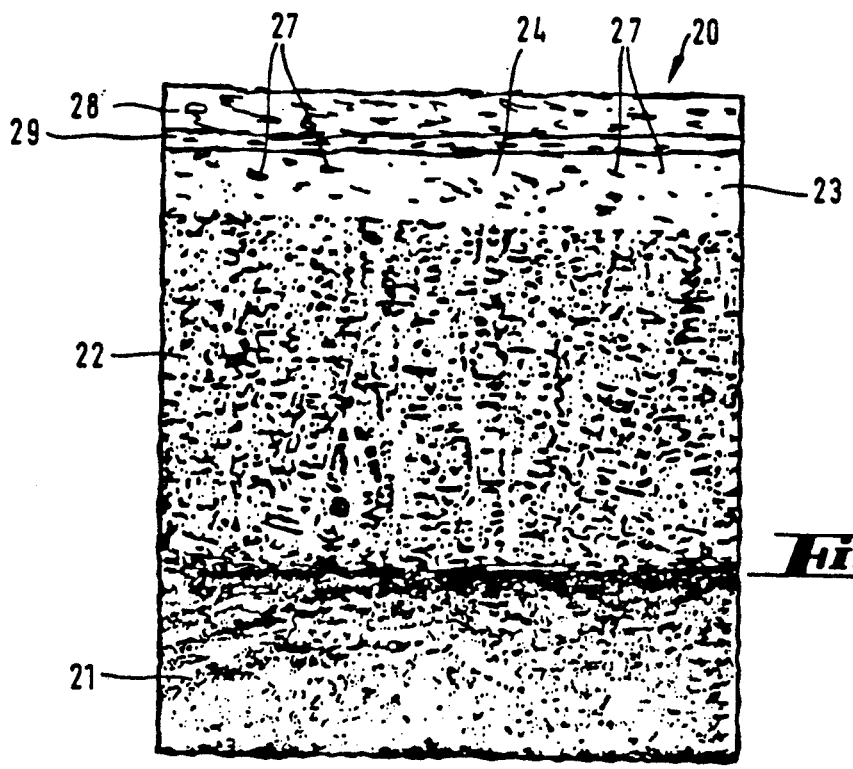
FIG. 3 shows a portion, in the nature of a polished section, of another embodiment of the laminate material according to the invention.

Examples in regard to the surface treatment of functional layers of lead bronze are shown in FIGS. 2 and 3.

In the example shown in FIG. 2 the laminate material 20 is intended for the production of tribological elements, preferably sliding or friction bearings. The laminate material 20 comprises a backing layer 21 and a functional layer 22. In the illustrated example the functional layer 22 comprises lead tin bronze of a composition comprising 10% by weight lead, 10% by weight tin, with the balance being copper. As shown in FIG. 2, when the lead tin bronze cools and solidifies the functional layer 22 assumed a dentritic structure which is extensively governed by copper crystallites. At the interface between the steel backing layer 21 and the functional layer 22, there is a diffusion bonding between the steel and the copper crystallites which appear dark in FIG. 2. At its free surface the functional layer 22 has been subjected to a laser beam surface treatment, as described above. That eliminated the dentritic structure of the lead tin bronze and produced a new structure which is characterised by a matrix 24 which is shown in white in the drawing and undissolved particles which are included therein, being in a finely divided globular configuration. The surface treatment additionally included the injection of hard particles, with the hard particles 26 being substantially smaller than the thickness of the treated surface region 23, but incomparably larger than the globular-distribution fine particles 25 of the undissolved components. The matrix 24 and the undissolved components 25 in globular distribution therein are frozen in a quasi amorphous condition while the hard particles 26 are incorporated in that surrounding material in a quasi amorphous condition.

Besides a substantial improvement in the functional qualities and in particular the sliding qualities, the surface region 23 which is formed by structure transformation, in co-operation with the backing layer 21, affords effective encapsulation of the portion of the functional layer 22 which has remained of dentritic structure. As there are no longer any lead particles worth mentioning in the surface region 23, the surface region 23 is practically insensitive to corrosion of the lead, even if old oils or oils with large amounts of additives come into contact with the surface of the functional layer in internal combustion engines. In the case of conventional functional layers of lead bronzes or lead tin bronzes, old oils or oils with large amounts of additives give rise to selective corrosion at the lead particles which occur between the copper crystallites or the dentrites. That results in the lead component being selectively dissolved out, leaving the copper skeleton which when subjected to a corresponding loading has a tendency to collapse. That risk is eliminated by virtue of the encapsulation effect in respect of the part of the functional layer 22, which is still of the dentritic structure, between the surface region 23 with the transformed structure and the backing layer 21, as long as the surface region 23 of the functional layer 22 is not worn away. Such wear is considerably delayed by the included hard particles 26.

The example shown in FIG. 3 again involves a laminate material 20 which is intended for the production of tribological elements, in particular sliding or friction bearings. The laminate material 20 shown in FIG. 3 comprises a backing layer 21 of steel and a functional layer or bearing layer 22 of lead bronze, for example of the composition CuPb22Sn.

In that arrangement the tin is completely dissolved in the lead component and serves only to reduce the susceptibility to corrosion of the lead component. In this example also the lead bronze of the functional layer 22 is of a dentritic structure. In relation to that functional layer 22 of lead bronze, there is also an increased risk of corrosion, in relation to a lead tin bronze functional layer, in respect of the lead particles which are included in the copper dentrices.

At the initially free surface thereof, the functional layer 22 has been transformed by the above-described process in a surface region 23 which is for example 50 to 100 $\mu$m in thickness into a structure in which the substantial part of the lead component which is insoluble in the copper is distributed in finely globular form in a matrix 24, with only a few very small larger lead particles 27 remaining. That surface region 23 is frozen with the finely globular distribution of the lead in the copper in a quasi amorphous condition.

In the example shown in FIG. 3 the functional layer 22 is also covered with an overlay 28 which, when the laminate material 20 is used to produce sliding or friction bearings or other tribological elements, serves as a running-in layer. The overlay 28 may selectively comprise alloys such as PbSn, PbSnCu, SnSb, PbSnSb and PbIn and is applied galvanically. A diffusion barrier layer 29 of about 5 μm in thickness is also disposed between the surface of the functional layer 22 and the overlay 28. In the illustrated example the diffusion barrier layer 29 is formed galvanically from nickel chromium alloy. It was galvanically applied prior to the overlay on the surface of the functional layer 22 which is treated with the laser beam. The overlay 28 was then galvanically applied to the diffusion barrier layer 29. The thickness of the overlay can be between 10 and 500 μm, the present example using an overlay of about 150 μm in thickness. Besides the diffusion barrier layer being formed from nickel chromium alloy, it is also possible to consider using CuSn, CuZn, NiSn, NiCo, Co, Ti and Ni to form the diffusion barrier layer.

We claim:

1. A laminate material comprising:
a backing layer; and
a functional layer disposed on said backing layer, said functional layer comprising a structure selected from the group consisting of a solid fusible dispersion and a substantially fusible mixture,
said solid fusible dispersion including a matrix and at least one component dispersed in said matrix, said component in at least a solid condition being at most partially soluble in said matrix,
said substantially fusible mixture including a plurality of components each of which is at most partially soluble in said plurality of components, and
said functional layer having a region on a side of said functional layer remote from said backing layer formed in a quasi amorphous condition induced through a melting step followed by extremely rapid cooling from a molten state, said region having a fine globular distribution of said components.

2. A laminate material according to claim 1 wherein said region of said functional layer has a thickness of between 20 μm.

3. A laminate material according to claim 1 wherein said region of said functional layer has a substantially uniform thickness.

4. A laminate material according to claim 1 wherein said functional layer comprises at least one metal selected from the group consisting of copper, aluminum, zinc and silver, and a further substance in fine particle form selected from the group consisting of lead, tin, bismuth, indium, nickel, manganese, silicon, carbon, molybdenum disulfide, boron nitride and plastic materials effective for tribological purposes.

5. A laminate material according to claim 4 wherein said carbon is in graphite particle form encased with a metal selected from the group consisting of nickel, aluminum and copper.

6. A laminate material according to claim 4 wherein said substance is molybdenum disulfide encased in a metal selected from the group consisting of nickel, aluminum and copper.

7. A laminate according to claim 4 wherein said plastic material is selected from the group consisting of polyester, PTFE, PEK and PEEK.

8. A laminate according to claim 4 wherein said functional layer is formed from lead bronze of the composition CuPb22Sn.

9. A laminate according to claim 8 further comprising an effective amount of up to 2% by weight of an additive to alloy with metal components of said functional layer, said additives selected from the group consisting of Li, Na, Ca, Ba, Bi, Si, P, As, Sb, S, Se, Te, Zn, Ti, Zr, Ce, Cr, Mn, Fe, Co, Ni, Si+Zr and Si+Zr+S.

10. A laminate according to claim 4 wherein said functional layer is formed from an aluminum/tin dispersion alloy selected from the group consisting of AlSn6CuNi, AlSn20Cu and AlSn40Cu.

11. A laminate according to claim 4 wherein said functional layer is formed from aluminum/lead dispersion alloy which is AlPb8Si4SnCu.

12. A laminate according to claim 1 wherein hard particles having a size between about 10 μm and 200 μm are subsequently incorporated into said region of said functional layer, said particles being frozen in a quasi amorphous condition and selected from the group consisting of TiC, WC, $Si_3N_4$, SiC, $Al_2O_3$, $MgCu_2$, $MgZn_2$ and $MgNi_2$.

13. A laminate according to claim 1 wherein hard particles having a size between about 10 μm and 200 μm are subsequently incorporated into said region of said functional layer, said particles being frozen in a quasi amorphous condition and selected from Laves-phases ($AB_2$) wherein the A-atoms and B-atoms have respective radiuses of $r_A/t_B$ which equals 1.225.

14. A laminate according to claim 1 wherein said region is formed with a globular distribution of said components in a quasi amorphous condition, said functional layer being initially covered with a soft metal overlay having a thickness of between 10 μm and 500 μm.

15. A laminate according to claim 1 wherein said region is formed with a globular distribution of said components in a quasi amorphous condition, said functional layer being initially covered with a soft metal overlay having a thickness of between 10 μm and 500 μm.

16. A laminate according to claim 15 wherein said functional layer is a friction bearing layer, said soft metal overlay partially penetrating through an outer surface of said friction bearing layer.

17. A laminate according to claim 15 wherein said soft metal overlay is a galvanically applied layer of an alloy selected from the group consisting of PbSn, PbSnCu, SnSb, PbSnSb and PbIn.

18. A laminate according to claim 15 further comprising a diffusion layer barrier of a thickness between about 2 μm and 10 μm, said diffusion layer barrier positioned between said soft metal overlay and said functional layer.

19. A laminate according to claim 18 wherein said diffusion layer barrier is selected from the group consisting of CuSn, CuZn, NiSn, NiCr, NiCo, Co, Ti and Ni.

20. A laminate according to claim 1 wherein hard particles having a size between 10 μm and 200 μm are subsequently incorporated into said region of said functional layer, said particles being frozen in a quasi-amorphous condition and consisting of glass powder.

* * * * *